United States Patent [19]

Ohta et al.

[11] Patent Number: 5,000,792
[45] Date of Patent: Mar. 19, 1991

[54] PIGMENT DISPERSING AGENT AND OFFSET PRINTING INK COMPOSITION EMPLOYING THE SAME

[75] Inventors: Hiroshi Ohta, Hyogo; Tsutomu Matsukawa, Chiba; Atsushi Nakada, Hyogo, all of Japan

[73] Assignee: 501 Sakata Inkusu Kabushikikaisha, Osaka, Japan

[21] Appl. No.: 360,282

[22] Filed: Jun. 2, 1989

[30] Foreign Application Priority Data

Jun. 9, 1988 [JP] Japan .................. 63-142681

[51] Int. Cl.$^5$ .......................... C08K 5/04; C08K 5/17
[52] U.S. Cl. ...................... 106/499; 106/23; 106/30; 106/241
[58] Field of Search ............. 106/23, 30, 241, 499

[56] References Cited

U.S. PATENT DOCUMENTS

| Re. 32,411 | 5/1987 | Hutter | 106/30 |
| 3,996,059 | 12/1976 | Stansfield et al. | 106/499 |
| 4,224,212 | 9/1980 | Topham | 106/22 |
| 4,415,705 | 11/1983 | Hutter | 106/30 |

FOREIGN PATENT DOCUMENTS

| 163977 | 7/1986 | Japan . |
| 1342746 | 1/1974 | United Kingdom . |
| 1373660 | 11/1974 | United Kingdom . |

Primary Examiner—William R. Dixon, Jr.
Assistant Examiner—Helene Klemanski
Attorney, Agent, or Firm—Fitch, Even, Tabin & Flannery

[57] ABSTRACT

A pigment dispersing agent comprising the reaction product of a polyester having a free carboxyl group, of which the acid value is in the range of from 10 to 60, with an amine compound of the formula:

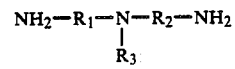

wherein $R_1$ and $R_2$ are alkylene radicals which can be the same or different, each containing from 2 to 6 carbon atoms, and $R_3$ is a radical of the formula $CH_3$— or $C_2H_5$—, wherein said reaction being conducted in the range of from 0.8 to 1.0 of equivalent molar ratio of the amino groups having active hydrogen of said amine compound to the free carboxyl groups of said polyester.

Application of the dispersing agent to nonaqueous paint or printing inks enables pigments to be dispersed in the vehicle at higher concentrations with low viscosity than in the prior art, and the dispersions thus obtained exhibit high coloring power and excellent storage stability.

10 Claims, No Drawings

PIGMENT DISPERSING AGENT AND OFFSET PRINTING INK COMPOSITION EMPLOYING THE SAME

BACKGROUND OF THE INVENTION:

1. Field of the Invention

The present invention relates to a pigment dispersing agent that may be used to stably disperse an inorganic or organic pigment in a nonaqueous organic medium at high concentrations and also a offset printing ink composition employing the same. More particularly, the present invention pertains to a pigment dispersing agent which is capable of exhibiting excellent printing performance when used in an offset printing ink.

2. Description of the Prior Art

In general, coating agents such as printing inks and paints are prepared by dispersing a finely divided pigment serving as a coloring agent in a medium called a vehicle which consists essentially of a binder resin and a solvent.

The pigment dispersion thus obtained is required to be stable without causing reaggregation of the pigment even after being stored for a long period of time and to be capable of forming a coating film which has excellent gloss and superior coloring properties.

In many cases, however, pigment dispersions prepared by dispersing finely divided pigments in vehicles have high viscosities, so that they are difficult to handle in such operations as removal from a dispersion mixer, stirring, transportation, etc. Therefore, the pigment concentration in the dispersions cannot unrestrictedly be increased from the viewpoint of operating efficiency.

For this reason, there is a demand for pigments that can be stably dispersed in vehicles at high concentrations and that permit the resulting dispersions to have a low level of viscosity.

The above-described demands depend upon the pigment dispersing performance of the vehicle employed and it is therefore a problem of considerable importance to develop vehicles which enable pigments to be effectively dispersed therein.

To this end, many studies have heretofore been conducted to improve binder resins that constitute vehicles. However, since binder resins themselves are polymers with high molecular weight and must maintain the important function of being film forming agents, the pigment dispersing performance thereof cannot be improved by a large margin. It is therefore actual practice to jointly use auxiliaries for dispersing pigments.

These dispersing auxiliaries are, however, a group of substances which are called surface active agents, and many of them have relatively low molecular weights. When such surface active agents are employed as dispersing auxiliaries for nonaqueous disperse systems, electrostatic repulsion cannot be expected to stabilize the dispersion and the stabilization of the dispersion must rely solely on the steric hindrance by the dispersing auxiliaries adsorbed on the surfaces of pigment particles. Accordingly, dispersing agents having relatively low molecular weights are not effective in providing satisfactory dispersion stability and present various restrictions with respect to applicability.

For instance, if a surface active agent having a relatively low molecular weight is used as a dispersing agent for an ink used in offset printing which is an image forming method utilizing the interfacial chemical repulsion that takes place between the water component, i.e., dampening water, and the oil component, i.e., oil-based ink, the emulsifying characteristics of the ink with respect to the dampening water are adversely affected, resulting in various problems such as scumming and greasing which are caused by the transfer of ink to the non-image area.

Various kinds of dispersing agent with polymer chains which have relatively high molecular weights have recently been proposed for the purpose of ameliorating the disadvantages of the conventional dispersing agents having relatively low molecular weights.

For example, Japanese Patent Publication No. 54(1079)-34009 (corresponding to BP 1,342,746) proposes a polyester oligomer obtained by esterification condensation of a hydroxycarboxylic acid, while Japanese Patent Publication No. 57(1982)-25251 (corresponding to BP 1,373,660) proposes a compound in the form of an amide obtained by carrying out reaction of the above-described polyester oligomer with an amine compound.

Further, U.S. Pat. No. 4,224,212 discloses a dispersing agent comprising a polyester oligomer and a polyalkylene imine having molecular weight, more than 500, preferably 10,000–100,000, which are linked together.

Japanese Patent Kokai (Laid-Open) No. 61(1986)-163977 discloses a reaction product of a polyester oligomer with either piperazine or alkyl piperazine.

The proposed dispersing agents are, however, still unsatisfactory in terms of their achievability to high pigment concentration and dispersion stabilization in nonaqueous disperse systems, although they are fairly effective in comparison with the conventional low-molecular dispersing agents. When these dispersing agents are used in offset printing inks, the emulsifying characteristics of the inks are adversely affected to a significant extent, so that satisfactory print results cannot be obtained. Thus, the prior art dispersing agents are impractical.

SUMMARY OF THE INVENTION

It is an object of the present invention to provide a considerably effective and novel dispersing agent which enables a pigment to be stably dispersed in a nonaqueous disperse system at high concentrations and which will not impair the printability of offset printing inks when it is used as a dispersing agent therefor.

It is another object of this invention to provide an offset printing ink composition employing said pigment dispersing agent.

Other objects and advantages of this invention may become apparent to those skilled in the art from the following description and disclosure.

DESCRIPTION OF THE PREFERRED EMBODIMENTS

The present invention provides a pigment dispersing agent comprising the reaction product of a polyester having a free carboxyl group, of which the acid value is in the range of from 10 to 60, with an amine compound of the formula:

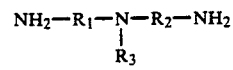

wherein $R_1$ are alkylene radicals (which can be the same or different) each containing from 2 to 6 carbon atoms, and $R_3$ is a radical of the formula $CH_3$— or $C_2H_5$—, wherein said reaction being conducted in the range of from 0.8 to 1.0 of equivalent molar ratio of the amino groups having active hydrogen of said amine compound to the free carboxyl groups of said polyester.

The present invention further provides an offset printing ink composition consisting essentially of a pigment, a resin, an organic solvent and any of the pigment dispersing agents described above in an amount of from 0.1 to 100% by weight based on the weight of the pigment.

The following is a comparison of the features of the dispersing agents according to the present invention with those according to the prior art.

The reaction products of polyesters derived from hydroxycarboxylic acids with amine compounds disclosed, for example, in the specifications of Japanese Patent Publication No. 57(1982)-25251 (corresponding to BP 1,373,660) have a structure wherein a tertiary amino group which serves as an activity point of adsorption on the pigment surfaces is present at the end of a polyester chain, whereas the dispersing agents according to the present invention have a structure wherein two polyester chains are usually linked with a specific amine compound and a tertiary amino group which serves as an adsorptive activity point is present in the center of the molecule, as shown by the following model:

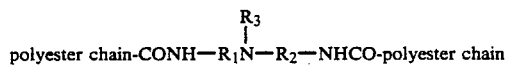

Accordingly, the dispersing agents according to the present invention have a molecular weight which is about double that of the dispersing agents disclosed in the prior art literature and therefore the dispersal efficiency by steric hindrance is markedly enhanced. Thus, the dispersing agents of the present invention exhibit a remarkably high level of effectiveness in stabilizing a dispersion.

Another of the features of the present invention resides in that, since the concentration of hydrophilic groups (imino groups) in the molecules is relatively low, there will be no adverse effects on such aspects of the printing performance as the emulsifiability when the dispersing agents of the present invention are used in offset printing inks.

In the case of the reaction product of a polyester oligomer with either piperazine or 1-alkyl piperazine that is disclosed in Japanese Patent Kokai (Laid-Open) No. 61(1986)-163977, there is a possibility of two polyester chains being linked as a result of the reaction with piperazine. In such a case, however, from the viewpoint of the proposition of the reactants in the reaction there will be neither a tertiary nor a secondary amino group which would serve as an adsorptive activity point in the manner mentioned in regard to the present invention. Accordingly, the reaction product fails to provide satisfactory effectiveness in stabilizing dispersion.

Although an adsorptive activity point is provided by the reaction with alkyl piperazine, since the activity point is located at the end of the polyester chain in the same way as in the case of the dispersing agent disclosed in Japanese Patent Publication No. 57(1982)-25251, the reaction product thus obtained is unsatisfactory in terms of dispersal efficiency or application for offset printing inks due to the reason mentioned above.

The dispersing agents of the present invention exhibit desired levels of dispersal and printing performance owing to the special structure described above.

Examples of polyesters which are usable in the present invention include those which are synthesized by polycondensation of compounds having carboxyl groups and compounds having hydroxyl groups and which have free carboxyl groups at the respective ends.

Examples of dicarboxylic acids which represent one kind of material usable to obtain polyesters having free carboxyl groups include succinic acid, adipic acid, azelaic acid, sebacic acid, 1,12-dodecanedicarboxylic acid, 1,2- or 1,4-cyclohexanedicarboxylic acid and terephthalic acid, etc. Examples of diols which represent another kind of material usable to obtain polyesters having free carboxyl groups include ethylene glycol, diethylene glycol, propylene glycol, etc. It is possible to obtain desired polyesters by carrying out esterification reaction using these materials while taking into consideration the molar ratio thereof.

To obtain desired dispersing agents according to the present invention, it is particularly preferable to employ polyesters obtained by polycondensation of fatty acids having hydroxyl groups. Examples of fatty acids having hydroxyl groups are ricinoleic acid, 12-hydroxystearic acid, a commercially available castor oil fatty acid containing a small amount of a saturated or unsaturated fatty acid, and hydrogenated fatty acids of this kind. To obtain desired polyesters, these materials are heated to a temperature of from 160° to 220° C. optionally with-/without an esterification catalyst while any water formed is removed, until a predetermined acid value is reached. The acid value of the polyesters is preferably in the range of from 10 to 60, more preferably from 20 to 50. If the acid value is greater than 60, the length of polyester chains is insufficient to achieve stabilization of dispersion by an increase in molecular weight. Further, since the concentration of the amide groups and other polar groups is excessively high, the printing performance in offset printing will be impaired.

If the acid value is less than 10, the concentration of groups serving as adsorptive activity points is excessively low. Accordingly, the adsorptivity of the dispersing agents on the pigment surfaces is weakened, and no satisfactory dispersing effect is obtained.

Practical examples of amine compounds which react with the above-described polyesters to link with the polyester chains include methyl imino-bis-ethylamine, methyl imino-bis-propylamine, methyl imino-bis-butylamine, ethyl imino-bis-ethylamine, ethyl imino-bis-propylamine, ethyl imino-bis-butylamine, N-methylamino-N-ethylamino methylamine etc. In the reaction of these amine compounds with the above-described polyesters it is most preferable to set the equivalent molar ratio of the amino groups of the amine compounds to the free carboxyl groups of the polyesters in the range of from 0.8 to 1.0.

The reaction of the two materials may be carried out in the following manner. After the above-described polyesterification reaction has been completed in the range of from 160° to 240° C., the contents of the reaction system are cooled down to around 100° C. Then, a predetermined amount of an amine compound is added thereto and the mixture is reheated to a temperature of from 160° to 180° C. to remove water generated by the formation of amide linkages from the reaction system, thereby obtaining a reaction product.

The reaction product thus obtained may be used in the form of a salt which can be produced by mixing the reaction product with a desired inorganic acid in a range within which the equivalent amount of tertiary amine groups is not exceeded and heating the mixture as necessary. Examples of acids usable to form salts are hydrochloric acid, sulfuric acid, propionic acid, benzene sulfonic acid, benzoic acid, and a dyestuff or pigment derivative containing at least one carboxylic acid or sulfonic acid group, e.g., sulfonated phthalocyanine dyestuffs. Among the salts, a quarternary ammonium salt formed using dimethylsulfuric acid as a salt forming agent leads to particularly favorable results.

Examples of solvents which may be suitably employed with the dispersing agents of the present invention include aromatic hydrocarbons such as toluene and xylene, ketone such as methyl ethyl ketone and methyl isobutyl ketone esters such as butyl acetate and Cellosolve acetate, and mineral oils which are mixtures of hydrocarbons consisting essentially of aliphatic hydrocarbons.

When the dispersing agents of the present invention are used in offset printing ink, which is the principal use thereof, mineral oils are the preferred solvents.

Pigments which are to be dispersed by the dispersing agents of the present invention are colorless or colored pigments. Practical examples of these pigments are inorganic pigments such as titanium dioxide, barium sulfate, calcium carbonate and magnetic iron oxide, organic pigments such as azo pigments, lake pigments, phthalocyanine pigments, isoindolinone pigments and quinacridone pigments, and carbon black. The dispersing agents of the present invention are effectively used to disperse oxidation-treated carbon black, phthalocyanine pigment, titanium dioxide, etc. among the pigments mentioned above.

In the field of offset printing inks, it is common practice to prepare a base ink by displacing the water in a water-containing pigment cake with an oily vehicle by the use of a flushing means. There has in the past been no dispersing agent suitable for obtaining a high-concentration pigment base in a flushing process, especially for yellow azo pigments. The dispersing agents according to the present invention, however, exhibit excellent effectiveness in such a flushing process. It is preferred that the amount of dispersing agent used is in the range of from 0.1 to 100% by weight, more preferably from 1 to 20% by weight, based on the various kinds of pigment mentioned above. However, the ratio depends on the properties of each particular pigment used, particularly the surface area thereof. It is therefore necessary to determine an optimal ratio in accordance with the kind of pigment used.

To produce offset printing inks using the dispersing agents according to the present invention, it is possible to employ various kinds of resin as binders, for example, known alkyd resins, rosin-modified phenolic resins petroleum resins, etc., and also to use other additives if necessary.

The present invention will be further described by way of Examples. However, the present invention is in no way restricted by those Examples. Polyesters used to produce the dispersing agents of the present invention were prepared as follows:

POLYESTER A 700 gm of a commercial grade of 12-hydroxystearic acid (having hydroxyl and acid values of 161 mg.KOH/gm and 182 mg.KOH/gm, respectively) was charged into a 1000 cc flask equipped with a nitrogen gas supply pipe, a condenser and a water separator and melted under heating at about 100° C. Thereafter, 70 gm of xylene and 1 gm of tetrabuthoxytitanate as a catalyst were added thereto, and the resulting mixture was heated to a temperature of from 180° to 200° C. The reaction was carried out for 12 hours while water formed in the esterification reaction was separated from the xylene. After about 30 gm of water had been collected (equivalent to a degree of conversion of 90% based on the hydroxyl value), the reaction was suspended and the contents were cooled to obtain a light-brown, viscous polyester solution. The nonvolatile content of the product was 90% and the acid value of the solid content was 34.9 mg.KOH/gm.

POLYESTER B

Esterification reaction was conducted for 10 hours in the same way as in the case of Polyester A except that a commercially available castor oil fatty acid (having hydroxyl value of 163mg.KOH/gm, acid value of 181 mg.KOH/gm) was employed to obtain a polyester solution having a nonvolatile content of 90%. The acid value of the solid content was 43.5 mg.KOH/gm.

EXAMPLE 1: PREPARATION OF DISPERSING AGENT A 300 gm of Polyester A and 11.5 gm of methyl-imino-bis-propylamine (corresponding to 0.95 equivalent with respect to the acid value of the polyester) were charged into a 500 cc flask similar to that employed for the esterification reaction. The reaction was carried out at a temperature of from 160° to 180° C. while water generated by the formation of amide linkages was separated from the xylene. After 80% of water based on the stoichiometric quantity had been collected, xylene was distilled off under reduced pressure.

The resulting product was a light-brown, slightly turbid, viscous liquid. According to gel permeation chromatography, the molecular weight of the product was 3,500. The amine value was 16.5 mg.KOH/gm, while the acid value was 7.3 mg.KOH/gm.

EXAMPLE 2: PREPARATION OF DISPERSING AGENT B

The same procedure as in Example 1 was carried out except that 300 gm of Polyester B and 12.1 gm of methyl imino-bis-propylamine (corresponding to 0.9 equivalent with respect to the acid value of the polyester) were used, thereby obtaining a light-brown, transparent, viscous liquid having a molecular weight of 3,000, an amine value of 17.8 mg.KOH/gm and an acid value of 9.2 mg.KOH/gm.

EXAMPLE 3: PREPARATION OF DISPERSING AGENT C

The same procedure as in Example 1 was carried out except that 300 gm of Polyester A and 14.0 gm of methyl imino-bis-butylamine (corresponding to 0.95 equivalent with respect to the acid value of the polyester) were used. thereby obtaining a light-brown, slightly turbid, viscous liquid having a molecular weight of 4,800, an amine value of 11.3 mg.KOH/gm and an acid value of 6.4 mg.KOH/gm.

EXAMPLE 4: PREPARATION OF DISPERSING AGENT D 3.6 gm of dimethylsulfuric acid (corresponding to 0.98 equivalent with respect to the amine value) was added to 100 gm of the product obtained in Example 1 and the resulting mixture was heated for 1 hour at 90 to 100° C. thereby converting the alkylimino groups to quarternary ammonium salt groups. Infra-red spectroscopic analysis of the product showed absorption bands at 750 and 1015 cm$^{-1}$ due to the presence of a "CH$_3$SO$_4$" anion. The amine value of the produce was not greater than 1.

COMPARATIVE EXAMPLE 1: PREPARATION OF DISPERSING AGENT E

The same procedure as in Example 1 was carried out except that 300 gm of Polyester A and 6.9 gm of N,N-dimethylaminopropylenediamine (corresponding to 0.95 equivalent with respect to the acid value of the polyester) were used, thereby obtaining a light-brown, wax-like product having a molecular weight of 1,800, an amine value of 35.5 mg.KOH/gm and an acid value of 14.2 mg.KOH/gm.

COMPARATIVE EXAMPLE 2: PREPARATION OF DISPERSING AGENT F 7.8 gm of dimethylsulfuric acid (corresponding to 0.98 equivalent with respect to the imino group) was added to 100 gm of the product obtained in Comparative Example 1 and the resulting mixture was heated for 1 hour at 90 to 100° C. thereby converting the tertiary amino groups to quarternary ammonium salt groups. Infra-red spectroscopic analysis of the product showed absorption bands at 750 and 1015 cm$^{-1}$ due to the presence of a CH$_3$SO$_4$ anion. The amine value of the product was not greater than 1,

PERFORMANCE EVALUATION TEST 1

Master bases for offset inks and offset inks were prepared according to the following formulations using the dispersing agents shown in Examples 1 to 4 and Comparative Examples 1 and 2. The properties and performances of the prepared master bases and offset inks are shown in Table 1.

It should be noted that Comparative Example 3 shown in Table 1 is an example in which no dispersing agent gas used.

| Indigo blue master base | |
|---|---|
| Phthalocyanine blue | 50 parts |
| Dispersing agent | 5 parts |
| Alkyd resin (Beckosol 8011, manufactured by Dainippon Ink & Chemical Company) | 10 parts |
| Rosin-modified phenolic resin varnish* | 10 parts |
| Solvent No. 5 (manufactured by Nippon Oil Company, Limited) | 25 parts |
| Black master base | |
| Carbon black | 50 parts |
| Dispersing agent | 5 parts |
| Alkyd resin | 10 parts |
| Rosin-modified phenolic resin varnish | 10 parts |
| Solvent No. 5 | 25 parts |

Each of the above-described compositions was thoroughly mixed and milled using a three-roll mill to prepare a master base and an offset ink was obtained according to the following formulation:

| | |
|---|---|
| Master base | 35 parts |
| Rosin-modified phenolic resin varnish* | 50 parts |
| Fluorine wax | 2 parts |
| Cobalt naphthelate (Co: 6%) | 1 part |
| Solvent No. 5 | 12 parts |

*It should be noted that the above-described varnish was prepared by uniformly dissolving under heating to 220° C., 40 parts of rosin-modified phenolic resin (Hitanol 271A available from Hitachi Chemical Co. Ltd.), 25 parts of linseed oil and 35 parts of Solvent No. 5.

TABLE 1

| No. | Example 1 | | Example 2 | | Example 3 | | Example 4 | | Comp. Example 1 | | Comp. Example 2 | | Comp. Example 3 | |
|---|---|---|---|---|---|---|---|---|---|---|---|---|---|---|
| Dispersing Agents | Agent a | | Agent b | | Agent c | | Agent d | | Agent e | | Agent f | | None (Note 1) | |
| Inks | Indigo blue | Black | Indigo blue | Black | Indigo blue | Black | Indigo blue | Black | Indigo blue | Black | Indigo blue | Black | Indigo blue | Black |
| Master base | | | | | | | | | | | | | | |
| Viscosity | 250 | 170 | 275 | 180 | 220 | 175 | 310 | 190 | 680 | 375 | 540 | 350 | Impossible to mill | |
| Coloring power | 115 | 108 | 112 | 106 | 116 | 106 | 114 | 105 | 105 | 103 | 107 | 102 | 100 | 100 |
| Storage stability | ◎ | ◎ | ◎ | ◎ | ◎ | ◎ | ◎ | ◎ | ○ | ○ | ○ | ○ | ○ | ○ |
| Ink | | | | | | | | | | | | | | |
| Gloss | ◎ | ◎ | ◎ | ◎ | ◎ | ◎ | ◎ | ◎ | ○ | ○ | ○ | ○ | ◎ | ◎ |
| Printing performance | ○ | ○ | ○ | ○ | ○ | ○ | ○ | ○ | △ | △ | △ | △ | ○ | ○ |

Note 1 in Table 1 denotes that attempts were made to prepare a master base according to the same formulation except that 5 parts of alkyd resin were employed in place of 5 parts of dispersing agent, but it was impossible to effect milling: therefore, an ink was prepared using a base having a pigment concentration of 25%.

The performance was evaluated according to the following methods:

Viscosity: Viscosity (poise) at 25° C. was measured using a Larey viscometer.

Coloring power: Coloring power with respect to white ink was measured on the basis of the coloring power in Comparative Example 3 and shown in %.

Storage stability: Each master base was stored for 1 month in a constant temperature bath at 25° C. and the viscosity measured at that time was compared with the viscosity of the master base when prepared (◉=excellent, ○=good and △=inferior).

Gloss: Gloss of print was judged by visual observation (◉=excellent, =good and △=inferior)

Printing performance: Printing was actually performed with a sheet-feed offset press manufactured by Mitsubishi Heavy Industries, Limited and such aspects as water allowance, ink transfer ratio, scumming and greasing were judged synthetically (◉=excellent, ○=good, △=inferior).

PERFORMANCE EVALUATION TEST 2

The following composition was charged into a small-sized flusher and water was completely separated by an ordinary flushing process, thereby displacing water with an oily vehicle.

| Composition: | |
|---|---|
| Water-containing cake (piment content: 25%) of a yellow azo piment (Cl.PIG.No.12) | 1600 parts |
| Dispersing Agent a | 50 parts |
| Alkyd resin | 100 parts |
| Rosin-modified phenolic resin varnish | 100 parts |
| Solvent No. 5 | 350 parts |

By this process, a base ink having an extremely high pigment concentration (40%) and a considerably low viscosity was obtained. The ink that was obtained from this base had a coloring power of 103% in comparison with the products obtained by the conventional method.

It should be noted that, when flushing was carried out without using a dispersing agent, the concentration limit of the yellow azo pigment base was 25%.

PERFORMANCE EVALUATION TEST 3

A master base having a pigment concentration of 40% was obtained using the same formulation as in the performance evaluation test 2 except that Dispersing Agent e obtained in Comparative Example 1 was employed in place of Dispersing Agent a.

The resulting master base had a higher viscosity than that of the base ink obtained in the performance evaluation test 2 and the coloring power of this master base was low, i.e., 78% of that of the conventional products.

Application of the dispersing agents according to the present invention to nonaqueous paint of printing inks enables pigments to be dispersed in the vehicle at a higher concentration than in the prior art, and the dispersions thus obtained exhibit high coloring power and excellent storage stability. As a result, it is possible to increase the operation efficiency by a large margin and also to reduce storage and transportation costs, In particular, when the dispersing agents of the present invention are applied to offset inks preparation of high-concentration master bases is enabled without adverse effects on the printing performance of the kind previously experienced with the conventional dispersing agents.

What is claimed is:

1. A pigment dispersing agent comprising the reaction product of a polyester having a free carboxyl group, of which the acid value is in the range of from 10 to 60, with an amine compound of the formula:

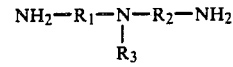

wherein $R_1$ and $R_2$ are alkylene radicals which can be the same or different each containing from 2 to 6 carbon atoms, and $R_3$ is a radical of the formula $CH_3$— or $C_2H_5$—, wherein said reaction being conducted in the range of from 0.8 to 1.0 of equivalent molar ratio of the amino groups having active hydrogen of said amine compound to the free carboxyl groups of said polyester.

2. A pigment dispersing agent according to claim 1 wherein the reaction product of said polyester with said amine compound is in the form of a salt.

3. A pigment dispersing agent according to claim 2 which is converted into a quarternary ammonium salt with dimethylsulfuric acid.

4. A pigment dispersing agent according to claim 1, wherein said polyester is obtained by esterification condensation of 12-hydroxystearic acid.

5. A pigment dispersing agent according to claim 1, wherein said amine compound is methyl imino-bis-propylamine.

6. An offset printing ink composition comprising a pigment, a resin and an organic solvent, said composition containing a pigment dispersing agent as defined in claim 1 in an amount of from 0.1 to 100% by weight based on the weight of said pigment.

7. An offset printing ink composition comprising a pigment a resin and an organic solvent, said composition containing a pigment dispersing agent as defined in claim 2 in an amount of from 0.1 to 100% by weight based on the weight of said pigment.

8. An offset printing ink composition comprising a pigment, a resin and an organic solvent, said composition containing a pigment dispersing agent as defined in claim 3 in an amount of from 0.1 to 100% by weight based on the weight of said pigment.

9. An offset printing ink composition comprising a pigment, a resin and an organic solvent said composition containing a pigment dispersing agent as defined in claim 4 in an amount of from 0.1 to 100% by weight based on the weight of said pigment.

10. An offset printing ink composition comprising a pigment, a resin and an organic solvent, said composition containing a pigment dispersing agent as defined in claim 5 in an amount of from 0.1 to 100% by weight based on the weight of said pigment.

* * * * *

UNITED STATES PATENT AND TRADEMARK OFFICE
CERTIFICATE OF CORRECTION

PATENT NO. : 5,000,792
DATED : March 19, 1991
INVENTOR(S) : Ohta et al.

It is certified that error appears in the above-identified patent and that said Letters Patent is hereby corrected as shown below:

On Title page

Item [73] Assignee, before "Sakata" delete "501".

Column 2, line 13, change "54(1079)-34009" to --54(1979)-34009--.
Column 4, line 32, after "C." insert a comma.
Column 4, line 57, after "polyesters" insert a comma.
Column 5, line 60, after "phenolic resins" insert a comma.
Column 6, line 5, in both instances, change "mg.KOH/gm" to --mg·KOH/gm--.
Column 6, line 16, after "value)" change the period to a comma.
Column 6, line 20, change "mg.KOH/gm" to --mg·KOH/gm--.
Column 6, line 27, change "163 mg.KOH/gm" to --163 mg·KOH/gm--
Column 6, line 28, change "mg.KOH/gm" to --mg·KOH/gm--.
Column 6, line 30, change "mg.KOH/gm" to --mg·KOH/gm--.
Column 6, line 46, change "mg.KOH/gm" to --mg·KOH/gm--.
Column 6, line 47, change "mg.KOH/gm" to --mg·KOH/gm--.
Column 6, line 58, change "mg.KOH/gm" to --mg·KOH/gm--.
Column 6, line 59, change "mg.KOH/gm" to --mg·KOH/gm--.
Column 6, line 67, after "used" change the period to a comma.
Column 7, line 1, change "mg.KOH/gm" to --mg·KOH/gm--.
Column 7, line 2, change "mg.KOH/gm" to --mg·KOH/gm--.
Column 7, line 10, after "C." insert a comma.
Column 7, line 25, change "mg.KOH/gm" to --mg·KOH/gm--.
Column 7, line 26, change "mg.KOH/gm" to --mg·KOH/gm--.
Column 7, line 55, after "C." insert a comma.
Column 7, line 60, after "1" change the comma to a period.
Column 8, line 3, change "gas" to --was--.

UNITED STATES PATENT AND TRADEMARK OFFICE
CERTIFICATE OF CORRECTION

PATENT NO. : 5,000,792

DATED : March 19, 1991

INVENTOR(S) : Ohta et al.

It is certified that error appears in the above-identified patent and that said Letters Patent is hereby corrected as shown below:

```
Column 8, line 30, after "Co." insert a comma.
Column 9, line 54, after "costs" change the comma to a period.
```

IN THE CLAIMS:
```
Claim 1, column 10, line 14, after "different" insert a comma.
Claim 7, column 10, line 38, after "pigment" insert a comma.
Claim 9, column 10, line 48, after "solvent" insert a comma.
```

Signed and Sealed this

Twenty-ninth Day of December, 1992

*Attest:*

DOUGLAS B. COMER

*Attesting Officer*   Acting Commissioner of Patents and Trademarks